Figure 1:
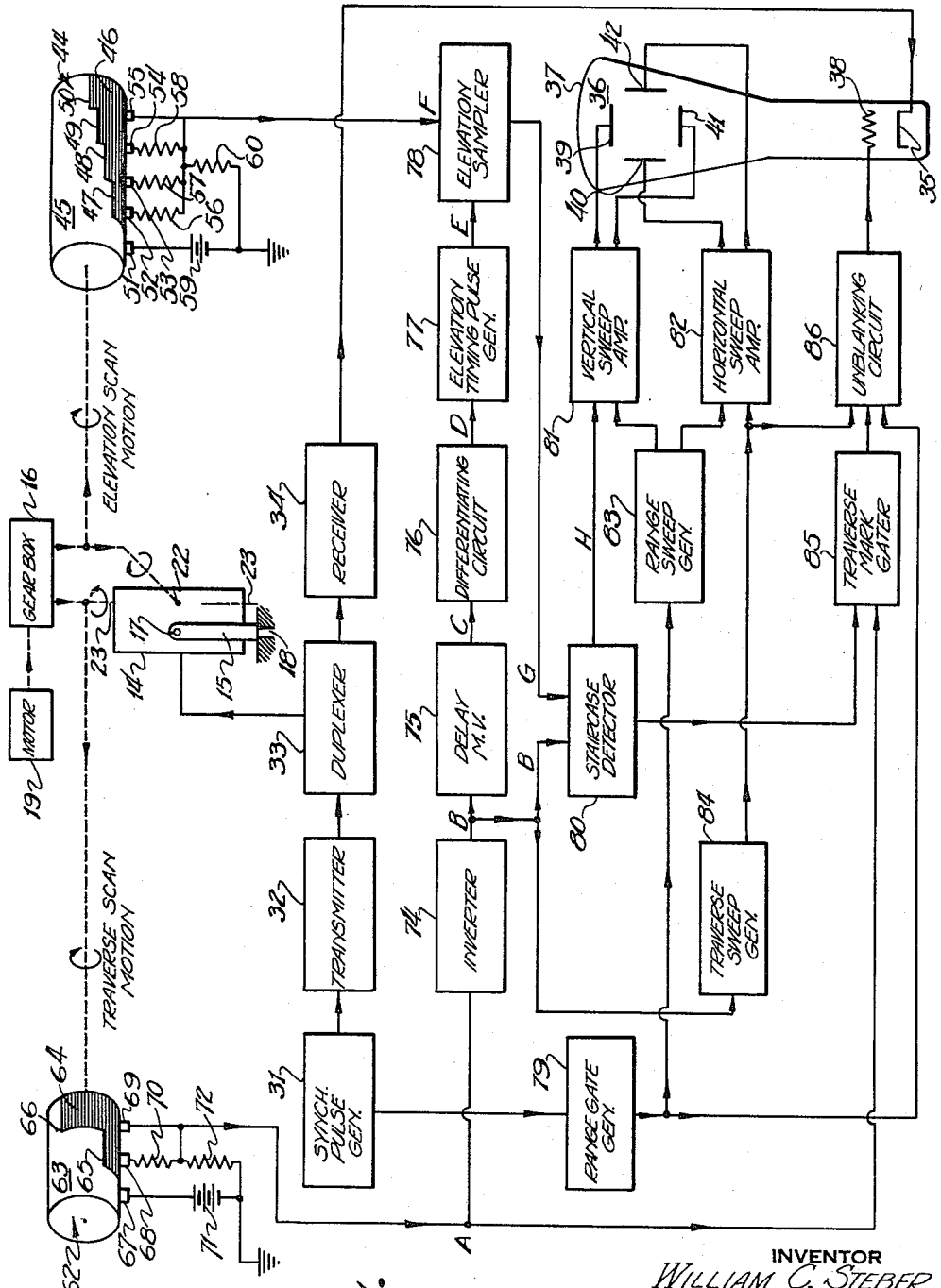

Sept. 13, 1960  W. C. STEBER  2,952,847
RADAR INDICATING SYSTEM
Filed March 4, 1954  4 Sheets-Sheet 2

INVENTOR
WILLIAM C. STEBER
BY
Thomas M. Terrill Jr.
ATTORNEY

Sept. 13, 1960

W. C. STEBER 2,952,847

RADAR INDICATING SYSTEM

Filed March 4, 1954

4 Sheets-Sheet 4

INVENTOR
WILLIAM C. STEBER
BY
Thomas M. Ferrill, Jr.
ATTORNEY

United States Patent Office 2,952,847
Patented Sept. 13, 1960

2,952,847

RADAR INDICATING SYSTEM

William C. Steber, Cold Spring Harbor, N.Y., assignor to Sperry Rand Corporation, a corporation of Delaware Filed Mar. 4, 1954, Ser. No. 413,986

7 Claims. (Cl. 343—7.9)

This invention relates to a radar indicating system, and more particularly to an indicating system having a two dimensional screen from which all three coordinates of the position of an object in space may be obtained.

In display apparatus used for indicating the position of an object in space, the relation of the object to a fixed point must be given in three coordinates. In radar equipment polar coordinates are usually used and the three coordinates are elevation and range and azimuth or traverse. Azimuth and traverse bear a close relation to each other. Azimuth is angular movement by the scanning beam about a vertical axis. Traverse scanning is angular movement by the beam about an axis perpendicular to the elevation axis and to the beam or to the median direction of the beam, if it is scannnig in elevation. Azimuth and traverse become equal at 0° elevation.

It is also customary to indicate the target position on the substantially flat screen of a cathode ray tube. Whether the radar equipment is being used for gun laying, early warning, as a navigational aid, for blind landing, or for some other purpose, the radar indication must be quickly and accurately translated into target position and made a basis for action.

Heretofore one method used for displaying the three coordinates of position on oscilloscope screens has been to indicate two coordinates such as azimuth and range on one scope and two coordinates such as azimuth and elevation on another scope. However, this system has the disadvantage of requiring a plurality of oscilloscopes and complicating the observer's task by giving him two scopes to watch and two sets of data to correlate and interpret.

It is also desirable to eliminate the complication of using colored or polarized light in connection with the display and of using special spectacles or other viewing devices by the observer. It is further desirable to eliminate the use of mechanical devices in connection with the display and to provide the indication as to three coordinates directly on the cathode ray tube screen using electronic means only.

It is an object of this invention to provide means for indicating three coordinates of position on a two dimensional screen without the use of colored or polarized light, without the necessity for the wearing by the operator of special spectacles or other viewing device, and without the use of mechanical components.

It is an object of this invention to indicate on an oscilloscope screen the elevation, range, and azimuth or traverse of a target.

It is an object of this invention to display an indication of elevation on a radar oscilloscope by a number of discrete, oblique areas, each area indicating azimuth or traverse horizontally and range along the diagonal.

It is an object of this invention to scan a volume in space and to indicate the positions of objects in said volume by displaying a plurality of separate areas, each representing a relatively thin flat section of the volume scanned, said areas being arranged to represent the volume scanned.

Figure 2:
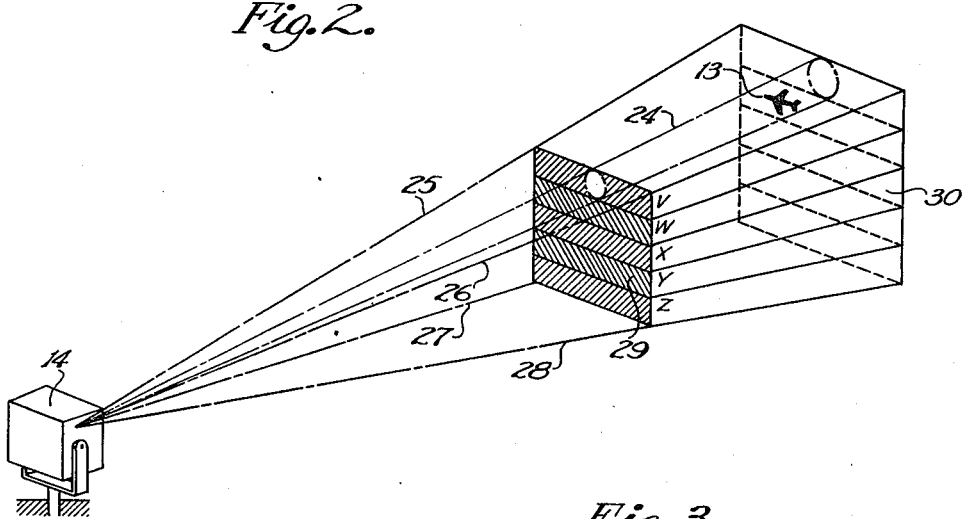
Figure 3:
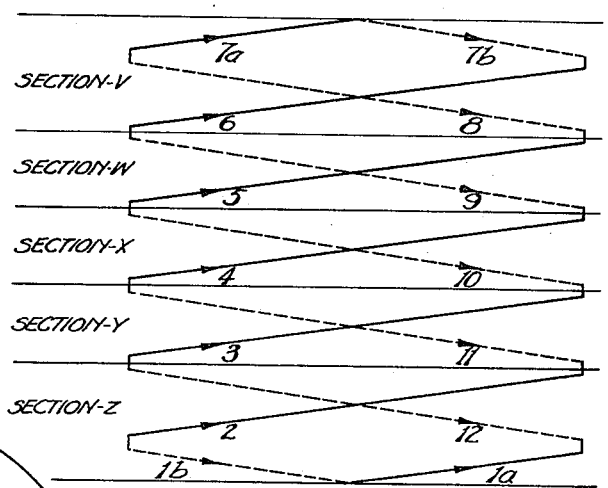
Figure 4:
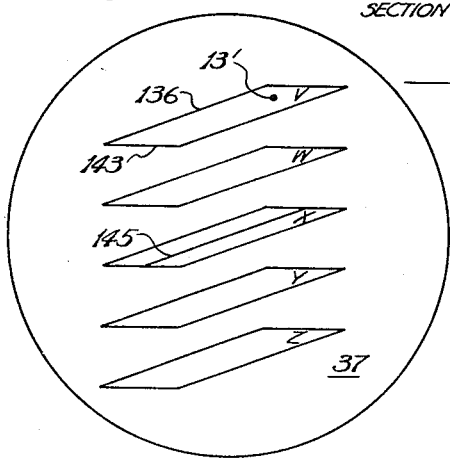
Figure 5:
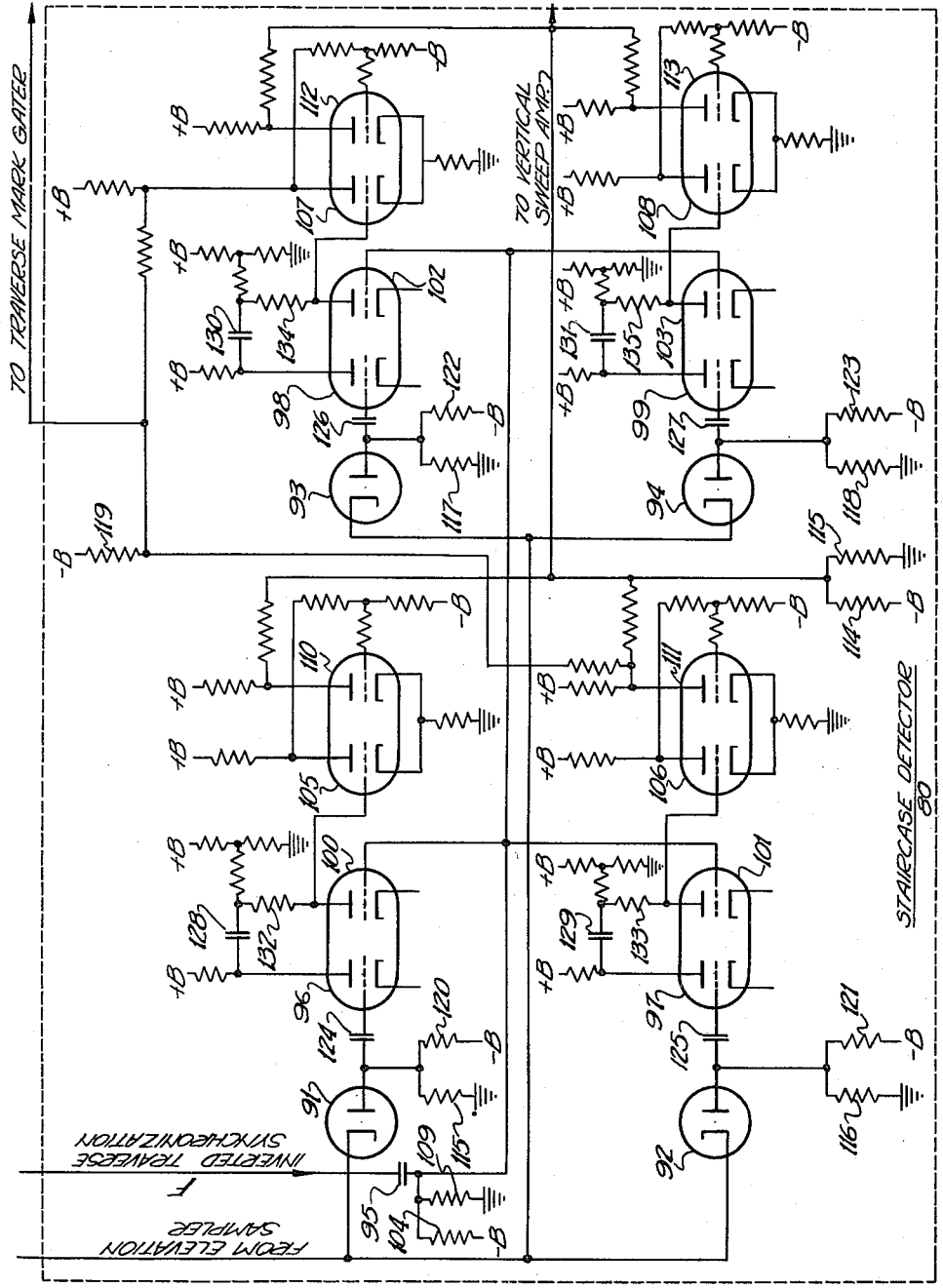
Figure 6:
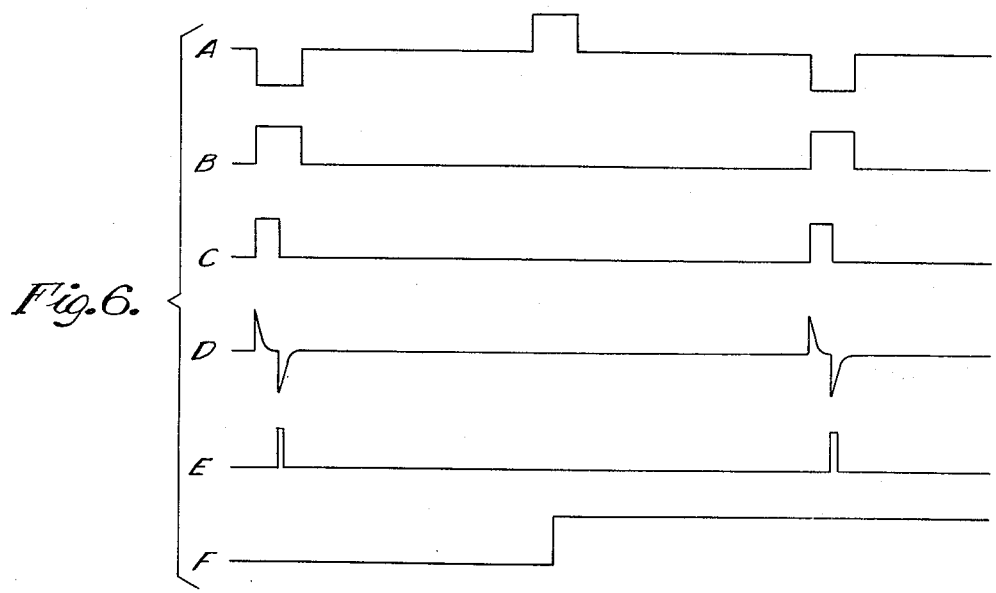
Figure 7:
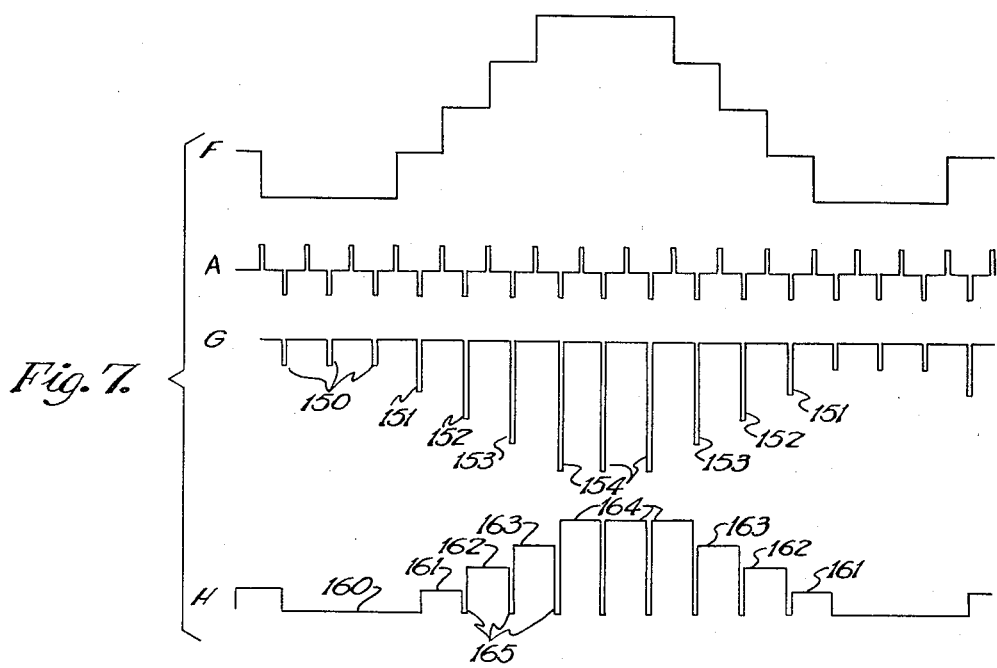

These and other objects will become apparent to those skilled in the art from a consideration of the following specification, taken in consideration with the accompanying drawings in which, Fig. 1 is a block diagram of a radar system embodying the present invention, Fig. 2 is a perspective view illustrating the manner in which the radar antenna of Fig. 1 scans a volume in space, Fig. 3 is a plot showing the manner in which the radar antenna scans in elevation and in traverse, Fig. 4 is an elevation view of the screen of an oscilloscope indicating the position of an object in three coordinates in accordance with this invention, Fig. 5 is a schematic diagram of the staircase detector used in Fig. 1, and Figs. 6 and 7 show waveforms useful in explaining the operation of this invention.

In the radar system shown in Fig. 1 there is provided an antenna component 14 which may be any kind of a radiator that will radiate a directive beam of radio frequency energy through space and which will cause that directive beam to scan angularly through a few degrees in elevation and in traverse.

Antenna 14 is arranged so that its beam oscillates continually through approximately five or ten degrees about elevation scan axis 22 at a relatively slow rate and through approximately five or ten degrees about traverse scan axis 23 at a relatively fast rate. The angular oscillation about the axis 22 gives an elevational scan and the angular oscillation about the axis 23 gives the traverse scan. Antenna 14 is mounted for rotation about a horizontal axis 17 in a yoke 15 which is mounted for rotation about a vertical axis 18. Horizontal axes 17 and 22 could be made coincident.

Fig. 2 shows the manner in which the antenna 14 scans the volume in space in elevation and traverse about elevation and traverse axes 22 and 23. The directive beam 24 sweeps through a substantially pyramidal volume bounded by the lines 25, 26, 27 and 28 by a series of elevationally displaced traverse sweeps. By the rotation about the horizontal and vertical axes 17 and 18, the scanned volume 25—26—27—28 can be oriented in any direction.

While the volume in space may be scanned by many types of elevational and traverse motion of the directional beam 24, Fig. 3 sets forth a preferred manner of scanning on which the present specification is based. In the type of scanning shown in Fig. 3, the beam 24 is given a relatively slow elevational scanning motion about axis 22 in simple harmonic motion and is caused to scan in traverse by being moved slowly from left to right and then back very quickly to again scan slowly from left to right. The elevational and traverse scanning cycles of the antenna 14 are synchronized coming through a gear box 16 to each scanning mechanism from a common motor 19.

In practice it has been found satisfactory to use an elevation scan having a period of ½ second and a traverse scan having a period of 1/24 second. Since the shafts connecting the gear box 16 with the scanning motions in antenna 14 turn once for each scanning cycle, the elevation scan shaft turns at 120 r.p.m. while the traverse scan shaft turns at 1440 r.p.m.

The manner of effecting the oscillatory elevation and traverse scanning is not a part of this invention and is not described here in detail. However many methods of providing such scanning are known to those skilled in the art. A preferred method is that of scanning in traverse by use of a Foster scanner described in Patent No.

2,521,844 to Gordy granted September 12, 1950. The slower elevation scan in simple harmonic motion might be caused by tilting the Foster antenna bodily about a horizontal axis or, more advantageously, by oscillating a light reflector about a horizontal axis. It will be understood that the traverse scan shaft from gear box 16 would rotate the cone of the Foster scanner while the elevation scan shaft would oscillate the reflector about its horizontal axis as by a crank arm. Other suitable types of scanning means are set forth in Radar Scanners and Radomes, vol. 26 of the Radiation Laboratory Series published by McGraw-Hill Book Co. in 1948.

Starting at the bottom of the chart in Fig. 3 and at the lowest part of the elevational movement of the beam 24, the beam starts upward along line 1a and then successively along lines 2, 3, 4, 5, 6 and 7a to reach the top of the elevational scan. It then starts down along line 7b and successively along lines 8, 9, 10, 11, 12 and finally through 1b to again reach the lowest part of the elevational scan. In Fig. 3 the solid lines indicate the traverse scans made during the upward part of the elevational scan while the dotted lines indicate the traverse scans made during the downward elevational sweep. As will be explained later, sections V, W, X, Y, Z of Fig. 2 are scanned as indicated between the horizontal lines in Fig. 3.

The antenna 14 is connected through a duplexer 33 to a receiver 34 and also to a transmitter 32 which is controlled by synchronizing pulse generator 31.

Duplexer 33 is an electronic switch which upon receiving a high powered pulse of radio frequency energy from the transmitter 32 will conduct it to the antenna 14 and will not apply it to the receiver 34. However, duplexer 33 upon receiving a low power echo from antenna 14 will apply it to receiver 34 to the exclusion of transmitter 32.

Transmitter 32 is an oscillator capable of generating high powered pulses of radio frequency energy, preferably in the microwave region. Synchronizing pulse generator 31 generates short pulses which modulate and control in time the emission of pulses by the transmitter 32. Receiver 34, also connected to duplexer 33, is a receiver for microwave radio energy and is capable of converting such energy into amplified video frequencies. Receiver 34 normally would contain radio frequency stages, a local oscillator, a mixer stage, intermediate frequency stages, detector and video frequency amplification stages.

The output of receiver 34 is applied to the cathode 35 of cathode ray tube 36. Cathode ray tube 36 has a screen 37, a control grid 38, vertical deflecting plates 39 and 41, and horizontal deflecting plates 40 and 42.

Also driven by the elevation scan shaft, which causes the elevation scanning of antenna 14 is a commutator generally indicated by reference numeral 44. Commutator 44 makes one rotation for each complete cycle of elevation scan by the antenna 14.

The portion 45 of commutator 44 is made of a conducting material while the portion 46 is made of an insulating material. The boundary of portions 45 and 46 of commutator 44 includes the steps 47, 48, 49 and 50. Brushes 51, 52, 53, 54 and 55 bear upon the surface of commutator 44 and are arranged in a line parallel to its axis. Brush 51 bears upon the end of commutator 44 which is entirely composed of conductive material 45. Brush 52 is in line with the step 47, and bears upon the insulating material 46 for a portion of the revolution of commutator 44. Brushes 53, 54 and 55 are respectively in line with the steps 48, 49, and 50, and bear upon the insulating material 46 for increasingly longer times in the order set forth. Brush 51 is connected through battery 59 to ground. Brushes 52, 53 and 54 are respectively connected each to one end of resistors 56, 57 and 58. The other ends of resistors 56, 57 and 58 are connected together and to brush 55, and this junction is connected through resistor 60 to ground.

Resistors 56, 57 and 58 have a decreasing value of resistance in the order named. The junction of resistors 56, 57, 58 and brush 55 is connected to elevation sampler 78, the circuit of which will be explained more in detail later.

Commutator 62 is driven by the traverse scan shaft which causes the traverse scanning of the antenna 14. Commutator 62 makes one complete revolution for each complete traverse scan by the antenna 14. The portion 63 of commutator 62 is made of conducting material while the portion 64 is made of insulating material. The boundary between the portions 63 and 64 comprises steps 65 and 66. Three brushes 67, 68 and 69 bear against the surface of the commutator 62 and are arranged in a line parallel with its axis. Brush 67 is connected to ground through a battery 71. Brush 68 is connected to ground through resistor 70 and resistor 72. Brush 69 is connected to ground only through resistor 72. The junction of resistor 70, resistor 72 and the brush 69 is connected to the input of inverter 74.

Inverter 74 contains an inverting device, which may be one stage of amplification, for inverting the voltage wave produced by commutator 62. Inverter 74 is operated at such a bias that the negative pulse of the inverted wave, appearing at the center of the traverse scan, is eliminated. The inverted wave produced by component 74 is applied to delay multivibrator 75 in which the positive pulses of this inverted wave are used to trip a multivibrator, producing short duration pulses. These short pulses from delay multivibrator 75 are applied to the input of differentiating circuit 76 where a positive spike is produced at the leading edges of the pulses and a negative spike is produced at the trailing edges.

The output of differentiating circuit 76 is applied to elevation timing pulse generator 77. Elevation timing pulse generator 77, which also may be a multivibrator circuit, produces a short duration positive pulse upon the application thereto of the negative spike from the differentiation circuit. These latter short duration positive pulses, coinciding in time with the trailing edges of the pulses produced by the multivibrator 75 are applied to an input of elevation sampler 78.

Elevation sampler 78 is essentially a coincidence circuit and may be a tetrode having inputs connected to its control and screen grids, respectively. One input is a stepped wave from commutator 44. On the occurrence of one of the pulses from elevation timing pulse generator 77 the elevation sampler 78 produces an output pulse which corresponds in amplitude to the instantaneous voltage being produced by the commutator 44. The output of the elevation sampler 78 is applied to staircase detector 80, the details of which will be explained below. The voltage wave from commutator 62 as inverted by the inverter 74 is also applied to the staircase detector 80.

Pulses from synchronizing pulse generator 31 are applied to the range gate generator 79 which produces a pulse in response to each pulse from the synchronizing pulse generator, and of a width corresponding to the portion of range desired to be indicated on cathode ray tube 36. Range gate generator 79 may include a delay multivibrator, the delay of which can be adjustably varied so that the range gate pulse produced will have the same period as the synchronizing pulse generator pulses but will be delayed in time therefrom.

The range gate pulse produced at the output of range gate generator 79 is applied to range sweep generator 83, which produces a sawtooth sweep wave synchronous with the pulses applied thereto and having a duration equal to that of the supplied pulses. The deflection wave produced by range sweep generator 83 is applied through vertical sweep amplifier 81 and horizontal sweep amplifier 82 respectively to vertical deflecting plate 41 and to horizontal deflecting plate 40 of the cathode ray tube 36.

The traverse synchronizing signal produced by commutator 62, after being inverted by component 74, is applied to traverse sweep generator 84 which provides a sawtooth deflection wave synchronously with each traverse scan of the antenna 14. The deflection wave produced by the traverse sweep generator 84 is applied through the horizontal sweep amplifier 82 to horizontal deflection plate 42 of cathode ray tube 36.

The circuit of the staircase detector 80 is arranged to supply a pulse to traverse mark gater 85 during the central portion of each elevation scan. The exact nature of this pulse and the manner of producing it will be described more in detail later. Commutator 62 supplies to traverse mark gater 85 a positive pulse at the center of each traverse scan. Traverse mark gater circuit 85 is essentially a coincidence circuit and provides at its output a gating pulse when the two pulses supplied to its inputs coincide. The traverse mark gater circuit may be a tetrode, having one input applied to its control grid and one input applied to its screen grid. The output of traverse mark gater 85 is applied to the unblanking circuit 86.

The output of traverse sweep generator 84 is also applied to the input of unblanking circuit 86 as is the output of range gate generator 79. Unblanking circuit 86 is a combining and amplifying circuit which supplies to the grid 38 of cathode ray tube 36 unblanking pulses causing the cathode ray to make a more or less visible trace on the screen 37. The unblanking pulses resulting from the waves supplied component 86 by the traverse sweep generator 84 and the range gate generator 79 are sufficiently positive to cause a visible trace. The unblanking pulse resulting from the wave supplied by traverse mark gater 85 is more positive to cause an intensified visible trace.

The circuitry of staircase detector 80 will now be explained more in detail. In staircase detector 80 there are four sections which are substantially the same. Each section has a diode 91, 92, 93 and 94. Each section has an amplifying triode 96, 97, 98 and 99, an elevation shut-off tube 100, 101, 102 and 103, and a multivibrator having two stable states, each comprising two triodes 105—110, 106—111, 107—112 and 108—113.

The pulses supplied by elevation sampler 78 are applied to the cathodes of diodes 91, 92, 93 and 94. The anodes of diodes 91, 92, 93 and 94 are respectively connected to ground through resistors 115, 116, 117 and 118 and to minus battery through resistors 120, 121, 122 and 123. Resistors 115, 116, 117 and 118 have an increasing value of resistance in the order named. The anodes of diodes 91, 92, 93 and 94 are respectively connected through condensers 124, 125, 126 and 127 to the control grids of tubes 96, 97, 98 and 99. The plates of tubes 96, 97, 98 and 99 are respectively connected through condensers 128, 129, 130 and 131 and through resistors 132, 133, 134 and 135 to the control grids of the first of the multivibrator tubes 105, 106, 107 and 108. The plates of the second multivibrator tubes 110, 111, 112 and 113 are connected through suitable resistors together and the junction is connected to B— through resistor 114, to ground through resistor 115, and to the input of the vertical sweep amplifier 77.

The inverted traverse synchronizing pulse produced by component 74 is connected through condenser 95 to the control grids of the elevation shut-off tubes 100, 101, 102 and 103. The junction of condenser 95 and the control grids is connected to B— through resistor 104 and to ground through resistor 109. Elements 95, 104 and 109 form a differentiation circuit.

The plate of the second multivibrator tube 111 and the plate of the first multivibrator tube 107 are each connected through a suitable resistor to an output junction which is connected through resistor 119 to minus battery and to one input of traverse mark gater 85.

In the operation of the radar system shown in Fig. 1, the directional, pulsed radio search beam 24 produced by antenna 14 continuously scans in traverse and in elevation a volume of space as best seen in Fig. 2. When these outgoing search pulses encounter a reflecting object 13, an echo is received by the antenna 14 which is passed through the duplexer 33, and the receiver 34 to the cathode 35 of the cathode ray tube 36 causing a visible trace 13' to appear on the screen 37, but only during the time when the unblanking circuit is supplying to the control grid 38 an enabling pulse.

The range gate produced by component 79 under control of the synchronizing pulse generator 31 causes a sawtooth range sweep wave to be developed by range sweep generator 83, which is applied through vertical sweep amplifier 81 and horizontal sweep amplifier 82 respectively to vertical deflecting plate 41 and horizontal deflecting plate 40, to cause a diagonal range sweep to appear on screen 37 of cathode ray tube 36. This diagonal range coordinate is represented by the diagonal edge 136 of the uppermost elevation plane V shown in Fig. 4.

The commutator 62 of Fig. 1 produces a voltage wave shown at A in Fig. 6, a negative pulse at the beginning of each traverse scan. This waveform is inverted and the middle pulse is eliminated in inverter 74 to produce waveform B of Fig. 6. The leading edges of the positive pulses of waveform B cause delay multivibrator 75 to operate and produce waveform C of Fig. 6. Waveform C of Fig. 6 is differentiated by component 76 to produce waveform D of Fig. 6. The negative pulses of waveform D, which are coincident with the trailing edges of the pulses in waveform C produced by the multivibrator 75, cause elevation timing pulse generator 77 to operate and produce the pulses shown in waveform E. These timing pulses produced by component 77 are thus coincident with the trailing edges of the pulses produced by the delay multivibrator 75 shown in waveform C.

Commutator 44 produces a voltage wave such as is shown partially in waveform F of Fig. 6 on an expanded scale. This waveform produced by commutator 44 is shown in its entirety as waveform A of Fig. 7. As will be seen, the waveforms of Fig. 7 are on a different time scale from those in Fig. 6. Waveform A of Fig. 7 corresponds to waveform A of Fig. 6. Waveform E from the elevation timing pulse generator 77 and waveform F from the commutator 44 are both applied to elevation sampler 78, which produces at its output waveform G of Fig. 7, a series of pulses corresponding in time to the pulses of waveform E and corresponding in amplitude to the instantaneous voltage level of waveform F.

Waveform B from inverter 74 and waveform G from elevation sampler 78 are both applied to staircase detector 80 which, by an operation to be explained more in detail below, produces one output as shown in the voltage waveform H in Fig. 7. This output is a series of increasing and then decreasing voltage pulses which are applied through vertical sweep amplifier 81 to the vertical plate 39 of the cathode ray tube 36. These pulses of waveform H cause the diagonal sweep applied to the deflection plates 40 and 41 to be successively displaced in a vertical direction from the bottom to the top of screen 37 and back to the bottom in synchronism with the elevational scanning of the antenna 14 as shown in Fig. 3.

Waveform B of Fig. 6, the inverted traverse synchronizing pulses from the commutator 62, is applied to the traverse sweep generator which produces a sawtooth traverse sweep wave. This wave is amplified in horizontal sweep amplifier 82 and applied to horizontal deflecting plate 42 to cause the cathode ray tube trace to be deflected horizontally. The traverse coordinate is represented by the horizontal edge 143 of the uppermost elevation plane V shown on the screen 37 in Fig. 4.

The operation of staircase detector 80 will now be explained more in detail. The elevational sampling pulses shown in waveform G of Fig. 7 are applied to the cathodes of diodes 91, 92, 93 and 94. The anodes of diodes 91, 92, 93 and 94 are each differently biased and to an ever-increasing potential in the order named. The shortest sampling pulses 150 of waveform G in Fig. 4, are not of sufficient amplitude to cause any of the diodes 91—94 to conduct. Under this condition, the first multivibrator tubes 105, 106, 107 and 108 are extinguished and the second multivibrators 110, 111, 112 and 113 are conducting. This means that plates of second multivibrator tubes 110, 111, 112 and 113, which are connected through suitable resistors to the vertical sweep amplifier, are at their lowest voltages and the lowest voltage level indicated at 160 in waveform H of Fig. 7 is being applied to the vertical deflecting plate 39. This causes the trace of cathode ray tube 36 to scan plane Z.

Pulse 151 of waveform G, the next longest pulses in amplitude, are applied to the cathodes of diodes 91—94. They are sufficient in amplitude to cause diode 91 to conduct the pulse through condenser 124 to the grid of amplifying tube 96. This produces a positive pulse in the plate of tube 96 which is conveyed through condenser 128 and resistor 132 to the grid of first multivibrator tube 105 causing that tube to strike and causing the second multivibrator tube 110 to extinguish. This applies full B+ from the plate of triode 110 to the resistor network including resistors 114 and 115, and raises the voltage applied to the vertical sweep amplifier 81 as represented by the voltage level 161 in waveform H of Fig. 7. This voltage applied to vertical deflection plate 39 causes the trace in cathode ray tube 36 to scan plane Y.

Just before the arrival of the next higher pulse in amplitude, pulse 152 of waveform G in Fig. 7, the inverted traverse synchronizing pulse, waveform B of Fig. 6, is applied through differentiating circuit 95—104—109 to the grids of all the shut-off tubes 100, 101, 102 and 103. Differentiating circuit 95—104—109 produces a positive spike coincident in time with the leading edge of the positive pulses of waveform B. These positive spikes are inverted by shut-off tubes 100—103. This causes a short negative pulse to be produced at the plates of these tubes and to be applied to the grid of first multivibrator tube 105, causing this tube to extinguish the tube 110 to conduct. This action lowers the deflection voltage applied to the plate 39 to its lowest level, as seen at 165 in waveform H of Fig. 7. The precedence in arrival time of the leading edge of the traverse synchronizing pulse of waveform B over that of the voltage sampling pulse of waveform G is seen by a comparison of the timing of waveform B and E in Fig. 6. This delay is caused by delay multivibrator 75.

However, shortly after the voltage returns to its lowest level 165, sampling pulse 152 is applied to the cathodes of the diodes 91, 92, 93 and 94 and is of sufficient amplitude to cause conduction in diodes 91 and 92. This causes the first multivibrator tubes 105 and 106 to conduct and the second multivibrator tubes 110 and 111 to extinguish. Thus the plates of both tubes 110 and 111 apply full B+ to the resistor network including resistors 114 and 115 and apply a second higher level of voltage as shown at 162 in waveform H of Fig. 4 to deflection plate 39. This causes the trace of cathode ray tube 36 to scan the middle elevation plane X.

Elevation sampling pulses 153 are of sufficient amplitude to cause diodes 91, 92 and 93 to conduct. This causes first multivibrator tubes 105, 106 and 107 to conduct and second multivibrator tubes 110, 111, 112 to extinguish, applying the still higher voltage level shown at 163 in waveform H of Fig. 7 to the vertical deflection plate 39, causing plane W to be scanned in screen 37. As explained above, the voltage level applied to the deflection plate 39 returns to its lowest level just before the application of each sampling pulse.

The highest sampling pulses 154 in waveform G are of sufficient amplitude to cause all four diodes 91, 92, 93 and 94 to conduct, causing second multivibrator tubes 110—113 to extinguish, applying the highest voltage level, that shown at 164, to the vertical deflecting plate 39. This causes the top elevational plane V in Fig. 4 to be scanned.

It will be obvious that the stepped voltage wave of waveform F in Fig. 7 could be applied directly to deflecting plate 39 to cause the vertically separated scanned areas as shown in Fig. 2 on the screen 37. It will further be obvious that there are many ways of generating the stepped voltage in synchronism with the elevational scan necessary to produce the separate elevation planes V—Z shown in Fig. 4. Switches or relays could be closed by projections on a shaft the angular movement of which is related to the elevational scan, to give the stepped voltage. A separate circuit or mechanical cam could produce the steps, being only synchronized with the elevational scan. It is not necessary for the scanning of planes V—Z that the voltage applied to the deflecting plate 37 return to the lowest level between steps. A method, usable in applicant's system, of deflecting a cathode ray beam in vertical steps in synchronism with vertical scanning by a radar search beam is shown in Patent No. 2,160,320 granted September 9, 1952 to Hall.

However, the system described above using the elevation sampling pulses and the staircase detector has the advantage of not requiring precise alignment between the commutator 44, the antenna 14 and the commutator 62. It eliminates the problems of close tolerance on the gearing between mechanical commutators, noisy commutation of the reference signals, brush smear and wear, and alignment procedure. In the system described above, it is only required that commutator 44 set a voltage level during the center portion of the duration of the commutator steps. The alignment of the beginning of these steps with the elevation scan becomes unimportant as does the time required for the voltage of waveform F of Fig. 7 to change from level to level. The precise time when the scanning of each plane on screen 37 is initiated is controlled by the relatively rapidly rotating commutator 62. The negative pulses of waveform A can be aligned with the initiation of each antenna traverse scan with relative ease.

In staircase detector 80 the plate of second multivibrator tube 111 and the plate of first multivibrator tube 107 are connected through suitable resistors together and then to one input of traverse mark gater 85. When the middle elevational plane X is being scanned on screen 37 the voltage applied to vertical deflecting plate 39 is at the level shown at 162 in waveform H of Fig. 7. When this voltage level is being supplied by the staircase detector 80, second multivibrator tube 111 is extinguished, and first multivibrator tube 107 is extinguished. This condition applies the maximum possible voltage to input of the traverse mark gater applied from the staircase detector. When, under this condition, a positive traverse synch pulse as shown in waveform A of Fig. 6 is applied to the other input of the traverse mark gater, a positive pulse will be produced in the output of the traverse mark gater. This positive pulse is applied to the unblanking circuit and will cause an intensified range trace 145 to appear in the center of the middle elevational plane X. This electronic fiduciary line is useful in orienting the antenna 14 so that the echo 13' is in the center of the traverse and elevation scans. As an alternative construction, an unblanking pulse covering the duration of middle plane X, or at least the central portion thereof could be provided by a commutator rotating in synchronism with commutator 44, or by other means.

The output of the traverse sweep generator 85 is applied to the unblanking circuit 86 so that the cathode ray tube 36 can make a visible trace on the screen 37 only during the center portion of the traverse as between the negative pulses shown in waveform A of Fig. 6. This allows time for the fast return of the traverse scanning sweep by the antenna sweep. It may also be desirable to shut off the operation of transmitter 32 during this traverse sweep return.

It will be seen that the invention described above provides a display which is a fair simulation of the target position in relation to the volume of space scanned in traverse and in elevation by the antenna 14. As seen in Fig. 2 the volume scanned by the elevation and traverse scanning of antenna, between lines 25, 26, 27 and 28 and bounded, through the action of the range gate, by planes 29 and 30 is a hexahedron. The planes V—Z on screen 37 represent the sections V—Z of the hexahedral volume, separated and displayed on screen 37 in oblique projection. The display immediately represents to the observer the position of the target with respect to the volume of space scanned as to three coordinates without the necessity for any mental calculation.

It will be understood that the invention is not limited to showing elevation by separate oblique parallelograms but could be employed to show range in separate rectangles separated along the diagonal, elevation being represented by the vertical coordinate and traverse (or azimuth) by the horizontal coordinate. Moreover, traverse could be represented by a number of oblique parallelograms separated horizontally, elevation being represented along the vertical coordinate and range along the diagonal coordinate. The volume scanned could be represented on screen 37 as an isometric, or other type of, projection of the sections scanned in space.

Although the invention has been described above with respect to a radar apparatus scanning a volume in space, it will be understood however that the display disclosed herein could be applied to the showing of the position of any object in a solid substance as, for instance, where a solid block of metal is explored by sonic or by other means for flaws or foreign objects.

It will also come within the purview of this invention to make the display on the screen 37 of the cathode ray tube 36 even more representative of the volume scanned in space by the antenna 14, by making the upper vertical edges of the planes V through Z, representing the extreme end of the range displayed, wider than the front lower edges, representing the nearer edge of the range, and by separating the planes V through Z at their back edges more widely than they are separated at their front edges.

The system hereinabove described provides a method of and means for displaying on a substantially flat screen of a cathode ray oscilloscope the positions of objects in three dimensional array in a volume of space. This is accomplished without the use of polarized or colored lights or mechanical components connected with the cathode ray tube. The components of the system are relatively simple.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a display system, means for producing a visible trace, first and second deflecting means for deflecting said trace respectively along first and second orthogonal coordinates on a substantially flat surface, means for applying deflection energy to the first and second deflecting means to cause the trace to be deflected at a relatively rapid rate in a direction diagonal to said two coordinates, means for supplying deflecting energy to the first deflecting means to deflect said trace through a scanning cycle and at a relatively slower rate along said first coordinate, means for supplying deflecting energy in discrete steps to said second deflecting means, the duration of one of said steps being at least as long as the deflecting cycle applied to the first deflection means whereby said trace depicts a plurality of separate oblique areas.

2. In a display system a cathode ray tube having means for producing an electron beam and a screen on which said electron beam produces a visible trace, means for deflecting said beam in each of two different coordinates, means for applying cyclical deflecting energy to one of said deflecting means to deflect said beam through a complete scanning movement at a relatively low rate along one of said coordinates, means for cyclically applying energy to both of said deflecting means to deflect said beam at a relatively faster rate and shorter period along a direction non-perpendicular to said one coordinate, means for applying energy in a plurality of discrete steps to the other of said deflecting means to deflect said beam along said other coordinate in a plurality of steps, the duration between steps being substantially at least as long as its scanning movement of the slowest deflection rate, whereby a plurality of separate oblique areas are scanned by said electron beam.

3. In combination search means for scanning a volume of three coordinates in space with pulsed energy and receiving means for receiving reflections of said energy from reflecting objects in said volume, indicating means having means for producing a visible trace and means to deflect said trace along each of two coordinates, means for deflecting said trace along one of its coordinates in synchronism with the scanning along one coordinate in space by the search means, means for deflecting said trace along both of its coordinates in synchronism with the scanning along a second coordinate in space by the search means, means for deflecting said trace along its other coordinate in discrete steps in synchronism with the scanning along the third coordinate in space by the search means so that said trace scans through a plurality of separate areas, and means connected to the receiving means for altering a characteristic of the trace when an echo is received.

4. The combination of claim 3 in which there is provided, means for varying the degree of visibility of the trace, and means for adjusting the visibility of said trace to a low degree except when said plurality of separate areas is being scanned.

5. The combination of claim 3 in which the three coordinates in space are traverse, range and elevation, and in which traverse is represented on the indicating means along a horizontal coordinate, range is represented along a diagonal coordinate, and elevation is represented by the arrangement of the plurality of the separate areas.

6. In combination search means for scanning a volume in space with a directive beam of energy pulses by a scanning motion in elevation and a scanning motion in traverse substantially perpendicular to said scanning motion in elevation, means for receiving reflections of said energy pulses from reflecting objects in said volume, an indicator having means for providing a visible trace and means for deflecting said trace along horizontal and vertical coordinates, means for applying deflecting energy to the horizontal deflecting means in synchronism with said traverse scan, means for applying deflecting energy to the horizontal and vertical deflecting means in synchronism with the emission of said pulses, and means for applying deflecting energy to said vertical deflecting means in a series of discrete steps synchronized with the said elevational scan, and means connected to the receiving means for altering a characteristic of the trace when an echo is received.

7. In combination search means for scanning a volume of three coordinates in space with pulsed energy and receiving means for receiving reflections of said energy from reflecting objects in said volume, indicating means having means for producing a visible trace and means to deflect said trace along each of two coordinates, means for deflecting said trace along one of its coordinates in synchronism with the scanning along one coordinate in space by the search means, means for deflecting said trace along both of its coordinates in synchronism with the scanning along a second coordinate in space by the search means, means for deflecting said trace along its other coordinate in discrete steps in synchronism with the scanning along the third coordinate in space by the search means so that said trace scans through an odd plurality of separate areas, means connected to the receiving means for altering a characteristic of the trace when an echo is received, and means for intensifying the diagonal scan at approximately the center of the central one of said odd plurality of separate areas.

References Cited in the file of this patent

UNITED STATES PATENTS

| | | |
|---|---|---|
| 2,578,970 | Gannaway | Dec. 18, 1951 |
| 2,610,320 | Hall | Sept. 9, 1952 |
| 2,648,061 | Parker et al. | Aug. 4, 1953 |
| 2,666,198 | Wallace | Jan. 12, 1954 |